(12) United States Patent  
Belder et al.

(10) Patent No.: US 11,603,711 B2  
(45) Date of Patent: Mar. 14, 2023

(54) DEVICE FOR TRANSPORTING, IN PARTICULAR SKIDDING OR JACKING, A HEAVY OBJECT

(71) Applicant: IHC HOLLAND IE B.V., Sliedrecht (NL)

(72) Inventors: Cornelis Belder, Oudewater (NL); Quintus Wilhelmus Petrus Maria Zuijdgeest, Zoetermeer (NL)

(73) Assignee: IHC HOLLAND IE B.V.

( * ) Notice: Subject to any disclaimer, the term of this patent is extended or adjusted under 35 U.S.C. 154(b) by 956 days.

(21) Appl. No.: 16/349,212

(22) PCT Filed: Nov. 15, 2017

(86) PCT No.: PCT/NL2017/050740  
§ 371 (c)(1),  
(2) Date: May 10, 2019

(87) PCT Pub. No.: WO2018/093254  
PCT Pub. Date: May 24, 2018

(65) Prior Publication Data  
US 2020/0190912 A1 Jun. 18, 2020

(30) Foreign Application Priority Data  
Nov. 15, 2016 (NL) .................................... 2017794

(51) Int. Cl.  
*E21B 15/00* (2006.01)  
*B65G 7/12* (2006.01)

(52) U.S. Cl.  
CPC .............. *E21B 15/003* (2013.01); *B65G 7/12* (2013.01)

(58) Field of Classification Search  
CPC ................................ E21B 15/003; B65G 7/12  
(Continued)

(56) References Cited

U.S. PATENT DOCUMENTS 3,031,167 A * 4/1962 Roussel .................... B66F 1/08  
193/41  
3,033,525 A * 5/1962 Johnson .................. B66F 1/025  
104/162

(Continued)

FOREIGN PATENT DOCUMENTS

CN 204024497 A 12/2014  
FR 2902844 A1 12/2007  
WO WO2011060883 A1 5/2011

OTHER PUBLICATIONS

The First Office Action for corresponding Chinese application No. 2017800692381; dated Jun. 30, 2020 (16 pages).

(Continued)

*Primary Examiner* — Matthew R Buck  
*Assistant Examiner* — Patrick F Lambe  
(74) *Attorney, Agent, or Firm* — Mendelsohn Dunleavy, P.C.

(57) ABSTRACT

The invention relates to a device (10) for transporting, in particular skidding or jacking, a heavy object (4) supported on at least one guide (2), comprising an actuator (7) for effecting transport, in particular at least one hydraulic cylinder, one end of which is configured for connection to the object (4) or a foundation and the other end is connected to a shoe (8) configured for connection to the guide (2). The shoe (8) comprises at least two pins (11) configured to be inserted into openings (9) in the guide (2) to provide, at least in the direction of the guide (2) a positive connection between the shoe (8) and the guide (2).

17 Claims, 3 Drawing Sheets

(58) Field of Classification Search
USPC .......................................................... 29/281.5
See application file for complete search history.

(56) References Cited

U.S. PATENT DOCUMENTS

| | | | | |
|---|---|---|---|---|
| 3,464,095 A | * | 9/1969 | Chambers | E21B 15/003 |
| | | | | 24/524 |
| 3,486,737 A | | 12/1969 | Campbell | |
| 3,821,934 A | * | 7/1974 | Maeda | B62D 57/00 |
| | | | | 104/162 |
| 4,007,915 A | * | 2/1977 | Chambers | B66F 1/08 |
| | | | | 104/165 |
| 4,030,699 A | * | 6/1977 | Heimke | B65G 7/00 |
| | | | | 254/108 |
| 4,544,135 A | * | 10/1985 | Albaugh | E21B 15/003 |
| | | | | 254/108 |
| 11,008,178 B1 | * | 5/2021 | Saurber, III | B65G 43/06 |
| 2003/0106172 A1 | * | 6/2003 | Burke | E01D 15/08 |
| | | | | 14/31 |

OTHER PUBLICATIONS

Written Opinion for corresponding Singaporean application No. 11201903143S; dated May 5, 2020 (6 pages).
PCT Written Opinion; Application No. PCT/NL2017/050740; dated Mar. 9, 2018.
PCT International Search Report; Application No. PCT/NL2017/050740; dated Mar. 9, 2018.

* cited by examiner

DEVICE FOR TRANSPORTING, IN PARTICULAR SKIDDING OR JACKING, A HEAVY OBJECT

The invention relates to a device for transporting, in particular skidding or jacking, a heavy object supported on at least one guide, such as one or more rails or skid beams attached to the object or attached to a foundation, i.e. stationary relative the ground or a deck or platform. The device comprises an actuator for effecting transport, in particular at least one hydraulic cylinder, one end of which is configured for connection to the object or the foundation and the other end is connected to a shoe configured for connection to the guide. The invention further relates to a system for and a method of transporting, in particular skidding or jacking, a heavy object.

As explained in U.S. Pat. No. 3,486,737, when it is desired to move a heavy load on a support in a straight line or in an arc, the moving sometimes is done by skidding the load. For example, when drilling wells from a platform at sea it is customary to skid the drilling rig on the platform from one well location to another. This is commonly done by means of double acting hydraulic cylinders that skid the rig in a series of short steps, between which the pistons are retracted in the cylinders for the next stroke.

U.S. Pat. No. 3,033,525 also addresses skidding and relates to a force-transmitting device for moving one member relative to another. The device comprises a plurality of face-to-face plates swingable between a tilted position to grip said one member, e.g. the upper flange of an I beam, and a position substantially perpendicular to said one member, in which the plates are free to slide along said one member. The plates may grip the other member at any point therealong.

WO 2011/060883 relates to an offshore platform and a method for controlling such an offshore platform, wherein supports can be adjusted with respect to the platform via a lifting device.

U.S. Pat. No. 4,544,135 relates to a skidding system of the hydraulic cylinder type. Thick cover plates with precut holes therethrough are fixed to the tops of skid beams. The system includes claws attached to the ends of the hydraulic cylinders having slidably mounted cylinder pins therein for engagement with the holes through the cover plates to anchor the ends of the hydraulic cylinders as the structure attached to the cylinders is skidded across the cover plates.

It is an object of the present invention to provide a device for skidding relatively heavy loads.

To this end, in the skidding device according the present invention, the shoe comprises at least two pins configured to be inserted into openings in the guide to provide, at least in the direction of the guide, preferably also in the lateral direction, a positive connection between the shoe and the guide.

Multiple pins enable transport of heavier objects and/or reducing the effect of the openings on the strength of the guide. E.g., a shoe comprising two smaller pins, with corresponding openings in the guide, may enable transfer of larger forces and/or have less effect on the structural integrity of the guide than a single, larger pin and corresponding openings in the guide.

In an embodiment, the pins are separated in the transport direction, which direction typically corresponds to the direction of the force exerted by the actuator(s) and, when the actuator comprises a hydraulic cylinder or (a pair of) parallel hydraulic cylinders, with the direction in which the at least one cylinder extends and retracts. Thus, the number of pins can be increased to e.g. three or more, e.g. four or six per shoe, and/or positioned along the centerline of the guide.

When a shear load is to be transferred by a plurality of pins, it is preferred that the load is equally distributed over the pins, e.g. for reasons of design efficiency. In an example, equal load distribution is achieved by using accurate dimensional and positional tolerances of the pins in the shoe and the openings in the guide. This implies that all pin locations in the guide must be machined accurately. In another example, one or more holes or pins are plastically deformable to some extent.

In an embodiment, the guide comprises groups of openings corresponding in number and mutual distance, e.g. pitch, to the pins in the shoe and preferably with the distance between the groups exceeding said pitch. In a refinement, the distance between the groups equals at least 80% of the maximum effective stroke of the actuator.

In another embodiment, the position of at least one pin is adjustable in the direction of transport.

In a refinement, the positions of all pins are adjustable in the direction of transport.

This mechanical solution enables an equally distributed load transfer via multiple pins side by side or in line, without requiring tight tolerances or plastic deformation of one or more holes or pins.

In an embodiment, the pins are slidably mounted in pin bearings to enable extending the pins, e.g. downwards or sideways, in the openings in the guide to lock the shoe to the guide and retracting the pins outwards from these openings to unlock the shoe from the guide and/or wherein the pins are slidably mounted in or on the shoe to enable adjusting the positions of the pins in the direction of transport and/or in a direction opposite to the direction of transport.

In another embodiment, the shoe comprises a support frame and the pins are slidably mounted in or on the support frame. In a refinement, the device comprises at least one actuator, e.g. mounted on or in the support frame, to slide and/or urge the pins to one side of the openings.

The invention further relates to a system for transporting, in particular skidding or jacking, a heavy object, comprising at least one guide, such as one or more rails or skid beams attached to the object or attached to a foundation, i.e. stationary relative the ground or a deck or platform, an actuator for effecting transport, in particular at least one hydraulic cylinder, one end of which is connected to the object or the foundation and the other end is connected to a shoe which in turn is connected to the guide, characterised in that the shoe comprises at least two pins inserted or insertable into openings in the guide providing, at least in the direction of the guide, preferably also in the lateral direction, a positive connection between the shoe and the guide.

In an embodiment, the position of at least one pin, preferably all pins, is adjustable in the direction of transport and/or in a direction opposite to the direction of transport.

The invention also relates to a method of transporting, in particular skidding or jacking, a heavy object supported on at least one guide comprising a series of openings, comprising the steps of: connecting one end of a device comprising an actuator for effecting transport, in particular at least one hydraulic cylinder, to the object or the foundation, connecting the other end of the device to the guide by inserting at least two pins from that end of the device into openings in the guide, and extending the actuator to transport the object.

When the stroke of the actuator has been completed, the pins are withdrawn from the openings to thus release the positive connection between the device and the guide. Once free to slide, the actuator is retracted and the pins are inserted in the next set of openings.

In an embodiment, after inserting the pins in the openings, the position of at least one pin, preferably all pins, is adjusted in the direction of transport or in a direction opposite to the direction of transport.

In another embodiment, the at least one pin, preferably all pins, is urged to the side of the opening where, during transport, the load is transferred, and locked.

Within the framework of the present invention "heavy load" refers to loads of typically at least 100 tons, typically at least 200 tons. Loads in excess of 400 are frequent. The word "openings", referring to the openings in the guide(s), such as a skid beams, and includes i.a. circular and rectangular openings extending in or through the top surface of the guide and positioned e.g. on the (imaginary) centerline of that surface. The word also includes slots and e.g. notches in the sides of the guide(s), e.g. in the edges of an upper flange of a skid beam. The pins and openings enable a positive connection between a shoe and a guide, i.e. a connection wherein forces are transferred primarily by interlocking parts (shape lock) and not primarily by friction (force lock).

The invention will now be explained in more detail with reference to the drawings, which schematically show embodiments of the skidding system according to the present invention.

Figure 1:
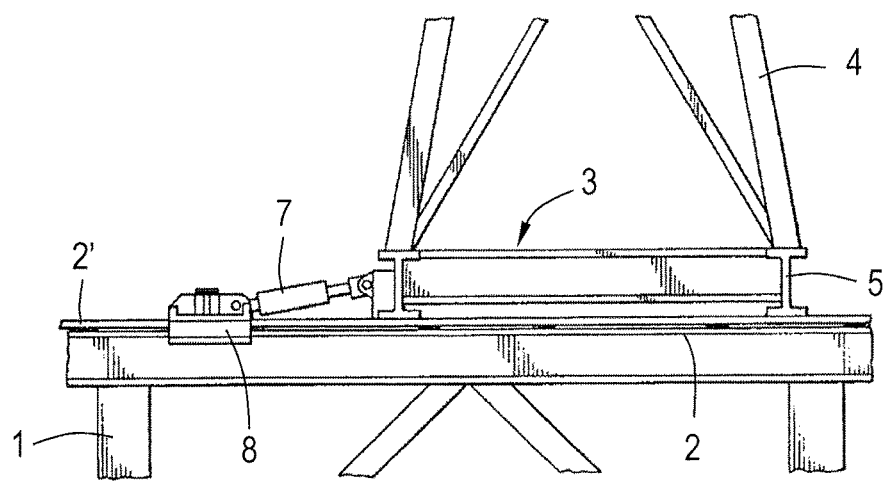
FIGS. 1 and 2 are a side view and a top view of a prior art apparatus for skidding a heavy skid base and drilling substructure.
Figure 2:
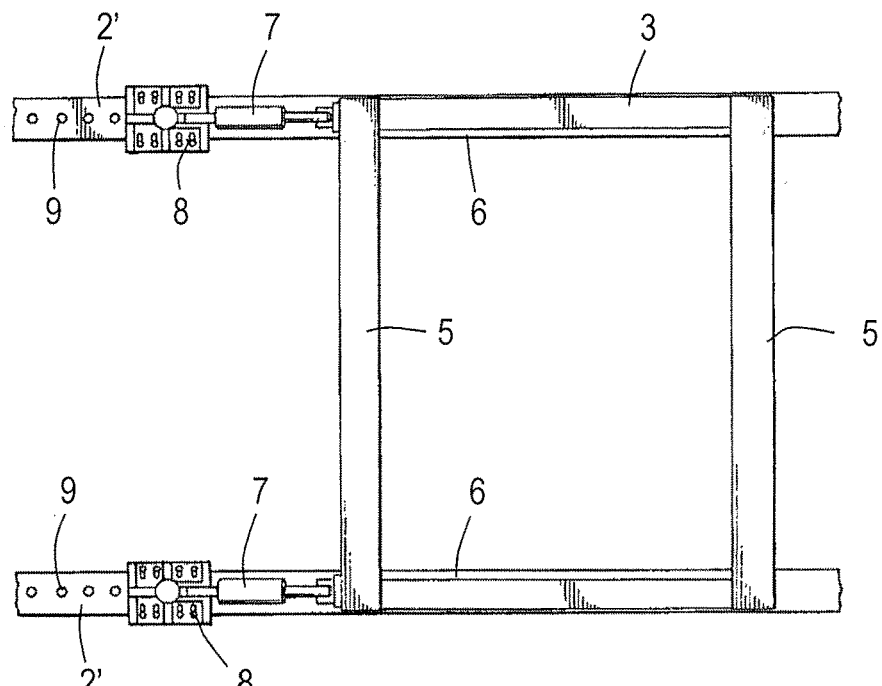

FIGS. 1 and 2 show a prior art skidding device installed on a drilling platform 1. The platform comprises skid beams 2 that extend the full length of the top of the platform and e.g. form the top member of a deck truss. A skid base 3 spans the two skid beams 2 and supports e.g. a drilling rig and equipment 4. The skid base 3 has two transverse I-beams 5 spanning the gap between the skid beams 2 and two further beams 6 to complete the rectangular skid base assembly. Hydraulic cylinders 7 have one end pinned to the skid base 3. The other ends of the cylinders are pinned to shoes, i.c. claws 8, to anchored the cylinders to the skid beams.

In this example, the claws ride upon cover plates 2' which form top surface of the skid beams 2. A row of holes 9 are cut through the cover plates 9 before they are welded to the top flanges of the skid beams 2. An elongate cylindrical pin (hidden from view) is slidably carried in each of the two claws 8. The bottom surface of each of two pins is sloped.

The various hydraulic lines, reservoirs, and controls to operate the hydraulic cylinders are not illustrated, as their selection, assembly, and usage is well known in the art.

During operation, the pin in each of the claws is lowered into a hole 9 in a cover plate 2' to positively connect (lock) the claws to the skid beams 2, and the rods of the hydraulic cylinders 7 are extended. The edges of the lower ends of the cylindrical pins thus bear against the sides of the holes in the cover plates, fixing the claws with respect to the platform, and the skid base will be moved as the rods extend. When the rods have been extended, and the skid base 3 moved, as much as desired, the claws 8 are puled toward the skid base 3. At this point, the sloped bottom surfaces of the pins are disposed against the edges of holes 9 of the cover plates 2'. The force on the claws 8 will cause the pins 26 to retract upwardly and the claws will be pulled toward the skid base.

Figure 3:
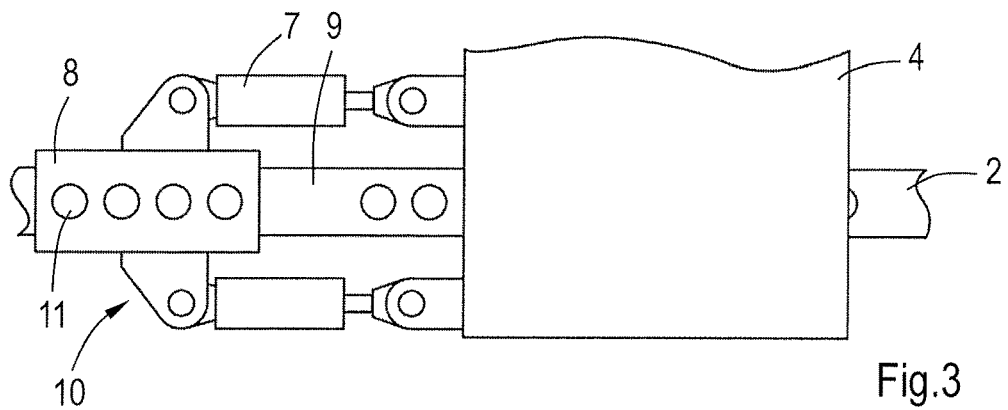
FIG. 3 is a top view of a device for skidding a heavy object along a skid beam in accordance with the present invention.

FIG. 3 shows a skidding device 10 according to the present invention for skidding a heavy object 4 supported on e.g. two parallel skid beams 2. The device 10 comprises at least one hydraulic cylinder, in this example two parallel hydraulic cylinders 7, one end of each of which is pinned to the object and the other end is pinned to a shoe 8 that is configured for connection to a skid beam 2. The shoe 8 comprises a plurality of pins 11, in this example four pins separated in the transport direction and arranged on an imaginary line that extends in that direction and parallel to the centerline of the skid beam 2. The skid beam 2 in turn comprises groups of openings 9 corresponding in number and mutual distance to the pins in the shoe.

The pins are slidably mounted in pin bearings 12 (shown in FIGS. 5 to 7) to enable extending the pins in the openings 9 in the skid beams to lock the shoe to the skid beam and retracting the pins outwards from these openings to unlock the shoe from the skid beam. The pin bearings 12 in turn are slidably mounted in or on the shoe, e.g. via a support frame, to enable adjusting the positions of the pins in the direction of transport.

Figure 4:
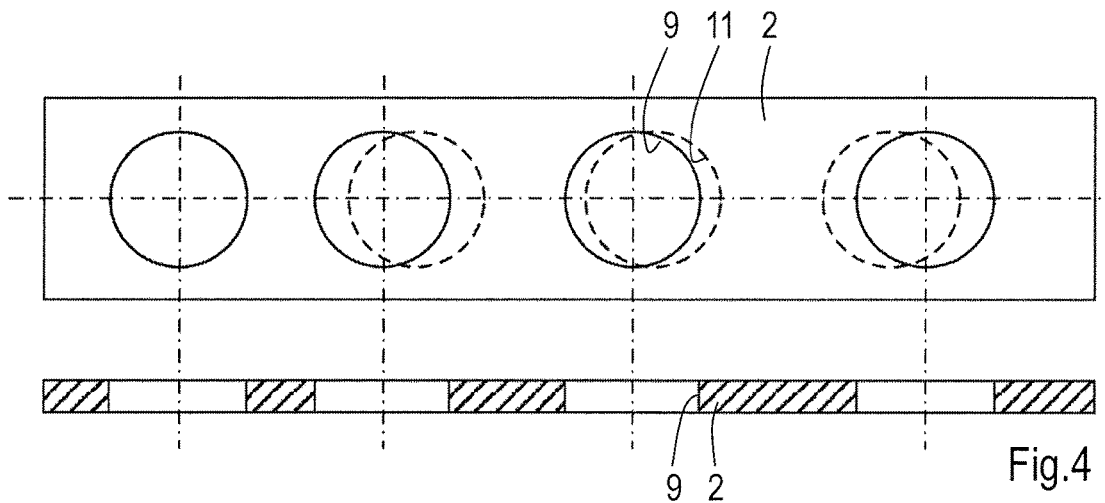
FIGS. 4 to 7 are schematic cross-sections to illustrate the principle of an adjusted multi-pin positive connection between a skidding device and a skid beam according to the present invention.
Figure 5:
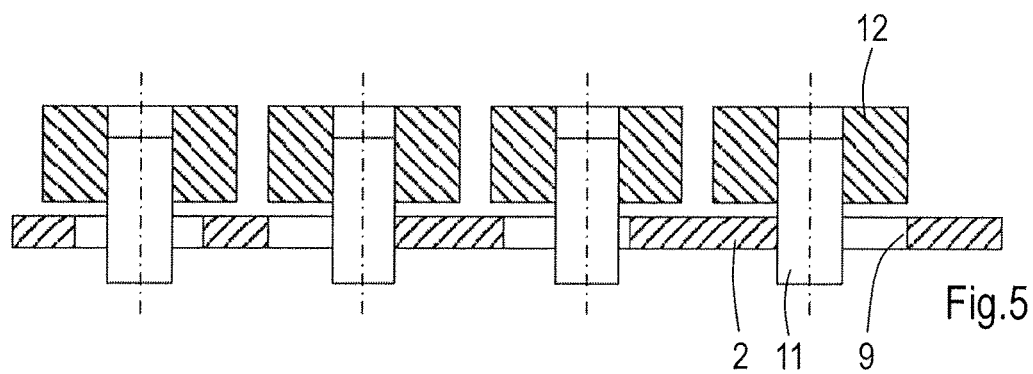

FIG. 4 illustrates (in an exaggeration to make the issue clearer) a misalignment between the openings 9 in the skid beam 2 and the pins 11 in the shoe. Such misalignment occurs if the tolerances in the positioning of the openings in the skid beam are not perfect. In this example, if the first pin and opening (seen from left to right in FIG. 4) are the reference, the second and third openings are too far to the left and the fourth opening is too far to the right. As a result, when the pins are inserted in the openings, as shown in FIG. 5, the first (leftmost) pin is properly aligned, whereas the remaining pins are not. This results in an unequal distribution of the load over the pins when the hydraulic cylinder is extended and the heavy object skidded. In this example, the second and third pins will be subjected to a relatively low loads, whereas the first and fourth pins will be subjected to a relatively high loads and possibly deform.

Figure 6:
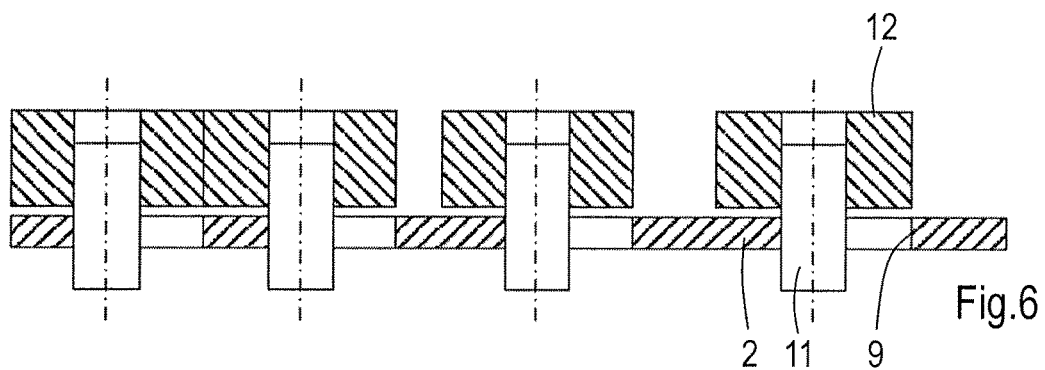
Figure 7:
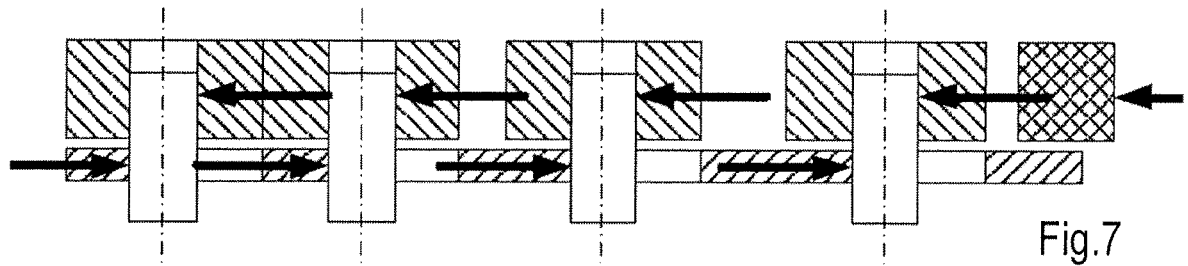

Equal distribution of the load over the pins is achieved by—prior to extending the hydraulic cylinder—sliding the pins towards and urging the pins against the sides of the openings where, during skidding, the load is transferred to the guide, as shown in FIG. 6. Thus, when the hydraulic cylinder is extended, the resulting load is distributed equally over the pins and openings, avoiding or at least reducing concentration of the load on one or a few pins.

Figure 8:
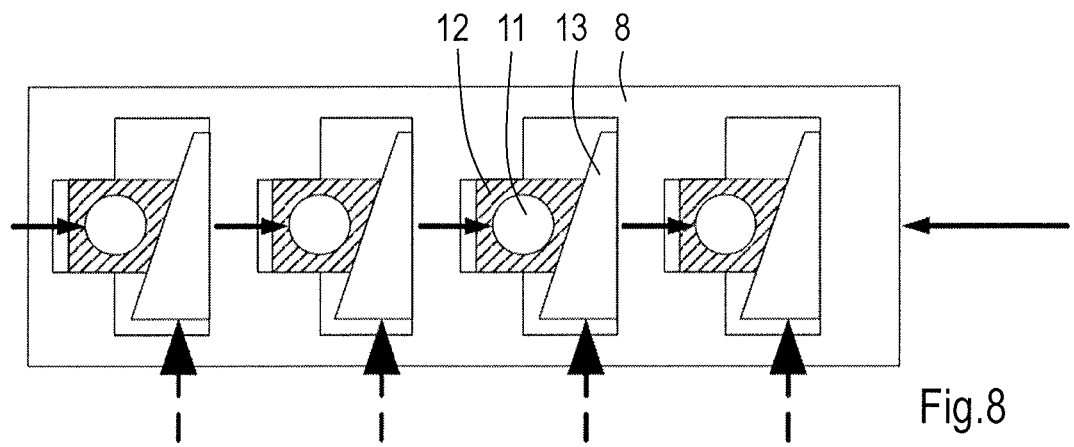
FIGS. 8 to 10 are schematic top views of different embodiments of means for adjusting pin positions.
Figure 9:
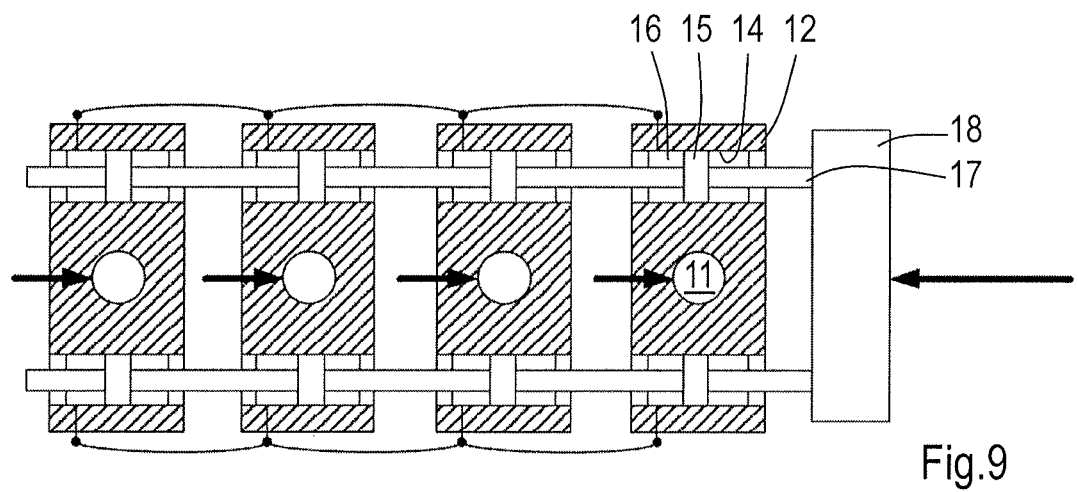
Figure 10:
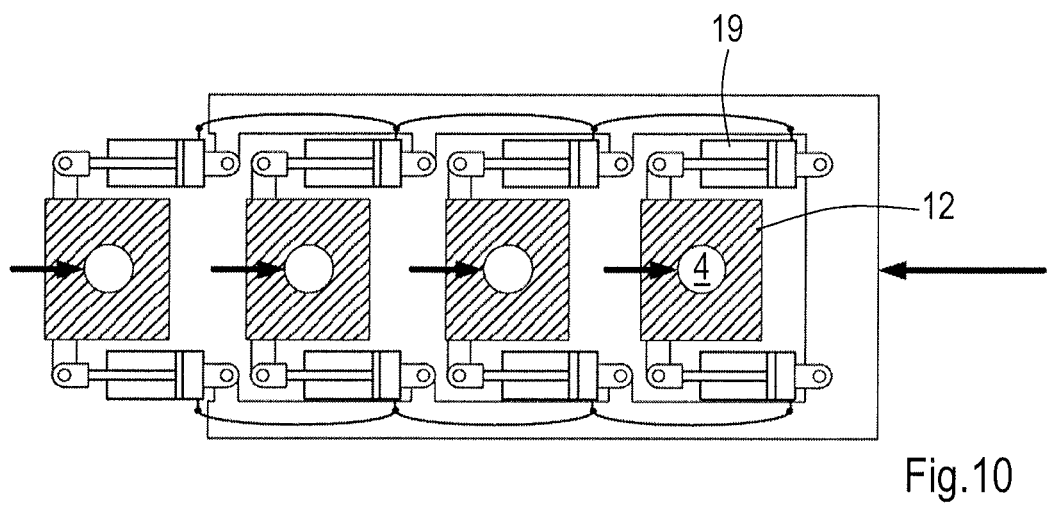

FIGS. 8 to 10 are schematic top views of different embodiments of means for adjusting pin positions.

FIG. 8 shows an embodiment wherein each of the pin bearing 12 is associated with a slidable wedge 13. By sliding the wedges individually, each pin 11 is urged to one side (left in the Figure) of the respective opening resulting in proper alignment of all pins.

FIG. 9 shows an embodiment wherein each pin bearing 12 comprises one or more hydraulic bores 14, each containing a hydraulic piston 15 dividing the bore in two closed compartments 16. The compartments on the same side of each of the bearings (in FIG. 8 the compartment on the left side of the bearings) are hydraulically connected. A rod 17 extends through a piston in each of the bearings, such that movement of the rod, or rods connected by a common block 18 (FIG. 8), will impose that movement on all bearings until a pin abuts a side of the opening in which it resides. The hydraulic connection between the bearings enables continued movement of the remaining pins until all pins 11 abut a side of an opening. When all pins are aligned, hydraulic flow between the bearings is blocked to fix the positions of the pins and skidding may commence.

FIG. 10 shows an embodiment similar to that in FIG. 9, wherein each of the bearings 12 is provided with one or more hydraulic cylinders 19 (rams) instead of bores.

The invention is not restricted to the above-described embodiments, which can be varied in a number of ways within the scope of the claims. For instance, the present invention is also applicable in transport of heavy loads along one or more curved guides and/or guides extending at an inclination or vertically (jacking). In another example, the pin bearings are operated (aligned) with mechanical means, such as a spindle or gears.

The invention claimed is:

1. Device for transporting a heavy object supported on at least one guide, comprising an actuator for effecting transport one end of which is configured for connection to the heavy object or a foundation and another end of which is connected to a shoe configured for connection to the at least one guide, characterised in that the shoe comprises at least two pins configured to be inserted into openings in the at least one guide to provide, at least in a direction of the at least one guide, a positive connection between the shoe and the at least one guide, and wherein at least one of the pins cooperates with a slidable wedge for adjusting a position of the at least one said pin in a transport direction and/or in a direction opposite to the transport direction.

2. The device according to claim 1, wherein the pins are separated in the transport direction.

3. The device according to claim 1, wherein the guide comprises groups of openings corresponding in number and mutual distance to the pins in the shoe.

4. The device according to claim 1, wherein positions of all of the pins are adjustable in the transport direction and/or in a direction opposite to the transport direction.

5. The device according to claim 1, wherein the shoe comprises a support frame and the pins are slidably mounted in or on the support frame.

6. The device according to claim 1, wherein the pins are slidably mounted in pin bearings to enable extending the pins in the openings in the guide to lock the shoe to the guide and retracting the pins from these openings to unlock the shoe from the guide.

7. The device according to claim 6, wherein the pins are also slidably mounted in or on the shoe to enable adjusting positions of the pins in the transport direction and/or in a direction opposite to the transport direction.

8. The device according to claim 1, comprising at least one actuator to slide and/or urge the pins to one side of the openings.

9. The device according to claim 1, wherein the device is configured for skidding or jacking the heavy object and the actuator comprises at least one hydraulic cylinder.

10. The device according to claim 1, wherein the pins are also slidably mounted in or on the shoe to enable adjusting positions of the pins in the transport direction and/or in a direction opposite to the transport direction.

11. System for transporting a heavy object, comprising at least one guide attached to the heavy object or attached to a foundation, an actuator for effecting transport one end of which is connected to the heavy object or the foundation and another end of which is connected to a shoe which in turn is connected to the at least one guide, characterised in that the shoe comprises at least two pins inserted or insertable into openings in the at least one guide providing, at least in a direction of the at least one guide, a positive connection between the shoe and the at least one guide, and wherein at least one of the pins cooperates with a slidable wedge for adjusting a position of the at least one pin in a transport direction and/or in a direction opposite to the transport direction.

12. The system according to claim 11, comprising at least one actuator to slide and/or urge the pins to one side of the openings.

13. The system according to claim 11, wherein the device is configured for skidding or jacking the heavy object and the actuator comprises at least one hydraulic cylinder.

14. The system according to claim 11, wherein all of the pins are adjustable in the transport direction and/or in a direction opposite to the transport direction.

15. Method of transporting a heavy object supported on at least one guide comprising a series of openings, comprising the steps of:
 connecting one end of a device comprising an actuator for effecting transport to the heavy object or a foundation,
 connecting another end of the device to the at least one guide by inserting at least two pins from the another end of the device into the openings in the at least one guide, and
 extending the actuator to transport the heavy object, wherein at least one of the pins, after inserting the pins in the openings, cooperates with a slidable wedge for adjusting a position of the at least one said pin in a transport direction or in a direction opposite to the transport direction.

16. The method according to claim 15, wherein the at least one pin is urged to the side of the opening where, during transport, a load is transferred, and locked.

17. The method according to claim 15, wherein the method is for skidding or jacking the heavy object and the actuator comprises at least one hydraulic cylinder.

* * * * *